(12) United States Patent
Hanson

(10) Patent No.: US 6,366,969 B1
(45) Date of Patent: *Apr. 2, 2002

(54) METHOD OF DETERMINING DATA TRANSFER RATE OF A DEVICE BY MEASURING THE TRANSFER RATE OF DATA BETWEEN A VIRTUAL DRIVE AND THE DEVICE

(75) Inventor: James H. Hanson, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/156,369

(22) Filed: Sep. 17, 1998

(51) Int. Cl.[7] .............................................. G06F 13/14
(52) U.S. Cl. .......................... 710/52; 710/60; 706/920; 716/16; 711/113
(58) Field of Search .............................. 710/52, 58, 60; 706/920; 716/16; 711/113

(56) References Cited

U.S. PATENT DOCUMENTS

| | | | |
|---|---|---|---|
| 4,851,998 A | | 7/1989 | Hospodor |
| 4,937,734 A | * | 6/1990 | Bechtolsheim ............... 711/202 |
| 5,121,487 A | | 6/1992 | Bechtolsheim |
| 5,245,638 A | | 9/1993 | Gustafson .................... 395/575 |
| 5,265,236 A | * | 11/1993 | Mehring et al. ............ 711/203 |
| 5,291,595 A | * | 3/1994 | Martins ....................... 707/200 |
| 5,566,206 A | * | 10/1996 | Butler et al. ................. 375/225 |
| 5,778,420 A | * | 7/1998 | Shitara et al. ............... 711/113 |
| 5,787,463 A | * | 7/1998 | Gajjar ........................ 711/114 |
| 5,812,564 A | * | 9/1998 | Bonke et al. ................ 714/769 |
| 5,819,066 A | | 10/1998 | Bromberg et al. .......... 395/500 |
| 5,857,147 A | * | 1/1999 | Gardner et al. ............ 455/67.1 |
| 5,944,802 A | * | 8/1999 | Bello et al. .................... 710/52 |
| 5,987,400 A | * | 11/1999 | Hirano ........................ 702/186 |
| 5,987,479 A | * | 11/1999 | Oliver ......................... 707/205 |
| 5,999,995 A | * | 12/1999 | Ueno et al. .................... 710/60 |
| 6,047,115 A | * | 4/2000 | Hohan et al. |
| 6,223,267 B1 | * | 4/2001 | Hodges et al. .............. 711/171 |

FOREIGN PATENT DOCUMENTS

| | | | | |
|---|---|---|---|---|
| JP | 02300932 | * | 12/1990 | .......... G06F/9/445 |
| JP | 004330665 | * | 11/1992 | .......... G11B/19/16 |
| JP | 07168673 | * | 7/1995 | .............. G06F/3/06 |

OTHER PUBLICATIONS

Ling, X.–P; WASMII: A Data Driven Computer On A Virtual Hardware; Apr. 5–7, 1993; pp. 33–42.*

* cited by examiner

Primary Examiner—Thomas Lee
Assistant Examiner—Abdelmoniem Elamin
(74) Attorney, Agent, or Firm—Knobbe, Martens, Olson, & Bear, LLP.

(57) ABSTRACT

A method of assessing performance of a device, such as a hard drive, in a computer system. The method allows measurement of data transfer rates during read and write operations from and to the hard drive. The method establishes a virtual drive in random access memory (RAM) subsystem to act as a destination and source for the data read from and written into the hard drive. The method determines the data transfer rate of the hard drive by monitoring the duration of the data transfer between the hard drive and virtual drive. The method achieves consistent and reliable assessment of performance of the hard drive.

16 Claims, 3 Drawing Sheets

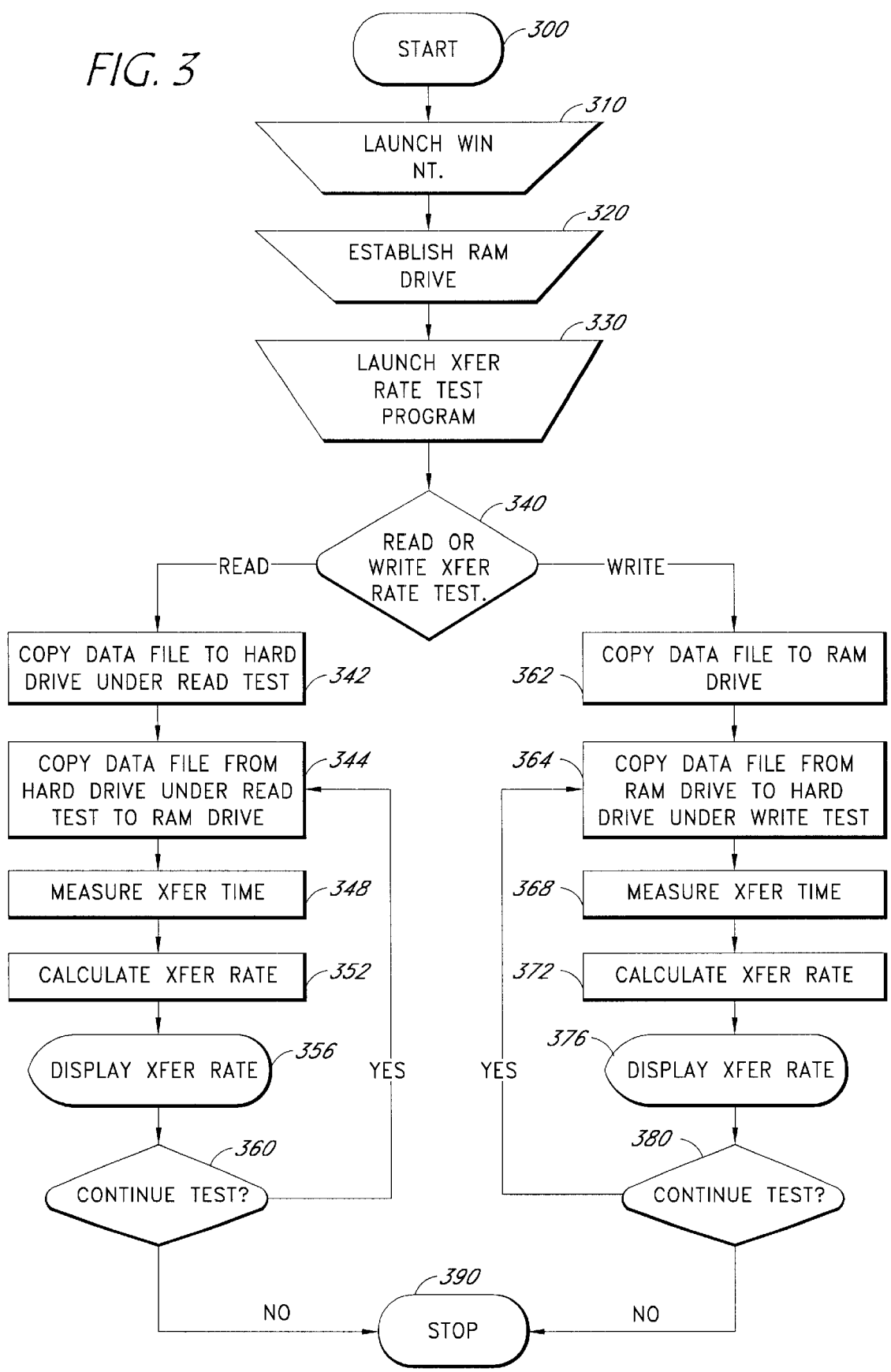

METHOD OF DETERMINING DATA TRANSFER RATE OF A DEVICE BY MEASURING THE TRANSFER RATE OF DATA BETWEEN A VIRTUAL DRIVE AND THE DEVICE

RELATED APPLICATIONS

The subject matter of pending U.S. Patent Application entitled SYSTEM FOR ASSESSING PERFORMANCE OF COMPUTER SYSTEMS, filed on even date herewith, application Ser. No. 09/156,370 is related to this application.

BACKGROUND OF THE INVENTION

1. Field of the Invention

The invention relates generally to methods of measuring performance of computer systems, such as personal computers. More particularly, the invention relates to measuring the performance of disk subsystems, such as hard drives.

2. Description of the Related Art

A powerful computer system is often noted for its ability to quickly store, retrieve, communicate, and process a large amount of information, such as conventional data, voice, graphics, and interactive video. With the evolution of intranets and internets, such as the public Internet, the need for more powerful computer systems is generally of paramount consideration to consumers. In assessing the power of a computer system, a consumer often measures the computer system performance using one of several commercially available benchmarks. A benchmark is a computer program which tests and measures performance of a computer system and its subsystems, such as disk, CD-ROM, memory, processor, and graphics/video subsystems.

These benchmark tests are intended to provide information about the overall performance of the computer system. One kind of benchmark testing involves measuring a data transfer rate within the computer system. The data transfer rate is the rate at which the computer (e.g., the main processor) transfers data among its internal components, such as between a hard drive and a random access memory (RAM). The data transfer rate may be of great importance in assessing the power of the computer system. When operating the computer system, certain data is read from and written to the main memory frequently and repeatedly. For instance, recognizing that the disk drive is spending much of its time reading the same information over and over leads to the conclusion that the data transfer rate may be an important criterion in determining the performance of the computer system.

Commercially available benchmarks are often inadequate for measuring computer system performance. Moreover, these benchmarks may provide different and inconsistent test results for the same computer system. For example, a benchmark manufactured by Ziff-Davis may provide test results which are different than those provided by Adaptec Threadmark 32. Additionally, these benchmarks often provide performance results which may not match a computer manufacturer's specifications. Consequently, a consumer may be forced to not rely on performance test results provided by commercially available benchmarks.

Computer manufacturers often use their own benchmarks which test computer subsystem performance, such as data transfer rate. These benchmarks are often designed for a specific product or group of products and, hence, may not be applied to compare computer performance from different manufacturers. Consequently, it is difficult to rely upon these benchmark programs for accurate and comparative results.

There may be other difficulties associated with determining data transfer rates in a computer system. These difficulties are often due to inherent operational characteristics of computer hard drives. More particularly, a hard drive typically transfers data in short read and write bursts, lasting few milliseconds. This is accomplished by reading a relatively small amount of data in a short burst, and immediately thereafter, writing the small amount of data, in a similarly short burst. Hence, a transfer of an entire data file is often broken up into a sequence of very short bursts of read and write operations. This operation renders it difficult to accurately measure the rate at which data is actually transferred between two memory subsystems (and, particularly, across the main/host bus).

Therefore, there is a need for a system and method of analyzing and determining the performance of computer subsystems objectively and, when repeated, with consistent results. The system should be suitable for use with a variety of operating systems having various subsystems and components.

SUMMARY OF THE INVENTION

To overcome the above-mentioned problems, the invention provides a method of assessing performance of a device in a computer. One embodiment of the invention is a method that comprises establishing a virtual drive, and transferring data between the virtual drive and the device. The method further comprises measuring the transfer rate of the device. In another embodiment, the invention provides a method of measuring performance of a hard drive in a computer. The method comprises establishing a RAM drive in the computer, and transferring a file from the RAM drive to the hard drive. The method further comprises measuring the duration of time needed to transfer the file, and determining a data transfer rate of the hard drive. In another embodiment, the method comprises establishing a RAM drive in the computer, and transferring a file from the hard drive to the RAM drive. The method further comprises measuring the duration of time needed to transfer the file, and determining a data transfer rate of the hard drive.

BRIEF DESCRIPTION OF THE DRAWINGS

The above and other aspects, features and advantages of the invention will be better understood by referring to the following detailed description, which should be read in conjunction with the accompanying drawings, in which:

FIG. 3 is a flow chart describing the steps executed by the computer system of FIG. 1.

DETAILED DESCRIPTION OF THE INVENTION

The following description is not to be taken in a limiting sense, but is made merely for the purpose of describing the general principles of the invention. The scope of the invention should be determined with reference to the claims.

Figure 1:
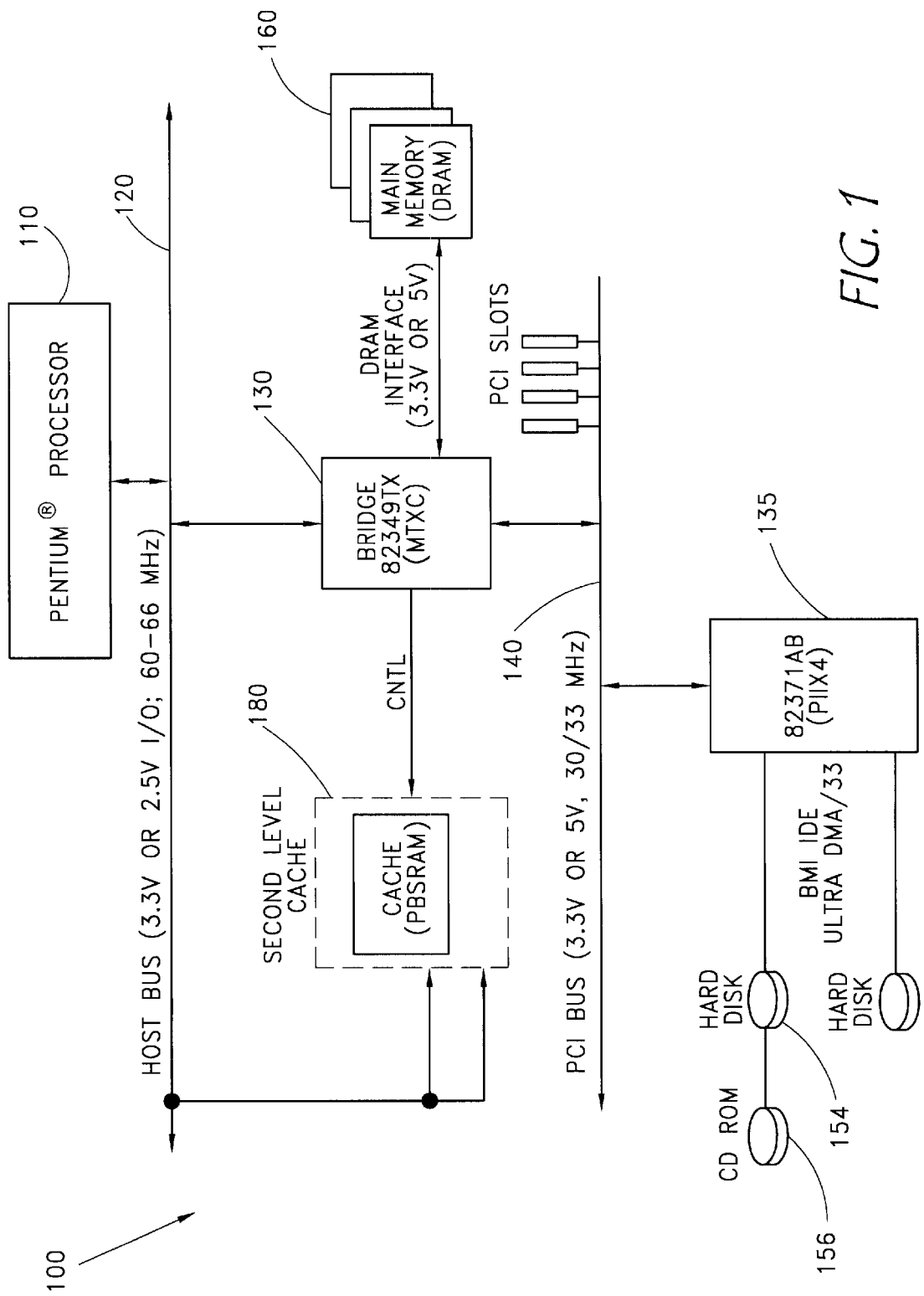
FIG. 1 is a block diagram of one embodiment of the computer system of the invention.

FIG. 1 is a block diagram of one embodiment of the computer system of the invention. As shown in FIG. 1, a computer system 100 comprises a 430TX PCIset, manufactured by Intel Corporation, having a main processor 110 connected to a host bus 120. The main processor 110 (sometimes referred to as the central processing unit or CPU) may, for example, comprise a Pentium® processor, manufactured by Intel Corporation. A bridge 130 connects the host bus 120 to another bus, such as a peripheral component interconnect (PCI) bus 140. The bridge 130 may comprise a 82349TX System Controller (MTXC), which is a subsystem of the 430TX PCIset. Additionally, the computer system 100 may comprise a 82371AB PCI ISA IDE Xcelerator (PIIX4) 135, which is another subsystem of the 430TX PCIset. The bridge 130 includes a 64-bit Host and DRAM bus interface, 32-bit PCI bus interface, and a second level cache interface.

The computer system 100 further comprises a main memory 160, such as a dynamic random access memory (DRAM), connected to the bridge 130 via a DRAM interface bus 170. The main memory 160 is a type of computer memory that may be accessed randomly, i.e., any byte of memory may be accessed without disturbing the content of other bytes. The computer system 100 may further comprise a cache memory 180 connected to the host bus 120 and the bridge 130. The cache memory 180 is typically a high-speed storage device, such as a static random access memory (SRAM). Memory caching is effective because most computer programs access the same data or instructions over and over. By keeping as much of this information as possible in the cache memory 180, the computer avoids accessing the main memory 160, which is typically slower than the cache memory 180.

The bridge 130 forms a Host-to-PCI bridge, and provides second level cache control and a full function 64-bit data path to the main memory 160. The bridge 130 integrates the cache and main memory control functions and provides bus control to transfers between the main processor 110, the main memory 160, the cache memory 180, and the PCI bus 140.

As explained in more detail below, one or more sets of instructions may be stored in the main processor 110, main memory 160, or an external mass storage device such as a hard drive 154 or CD-ROM 156. Pursuant to these instructions, the main processor 110 executes the benchmark testing to analyze and determine the performance of one or more of the subsystems in the computer system 100. In this embodiment, the main processor 110 analyzes the performance of the hard drive 154 by measuring data transfer rate between the main memory 160 and the hard drive 154.

Figure 2:
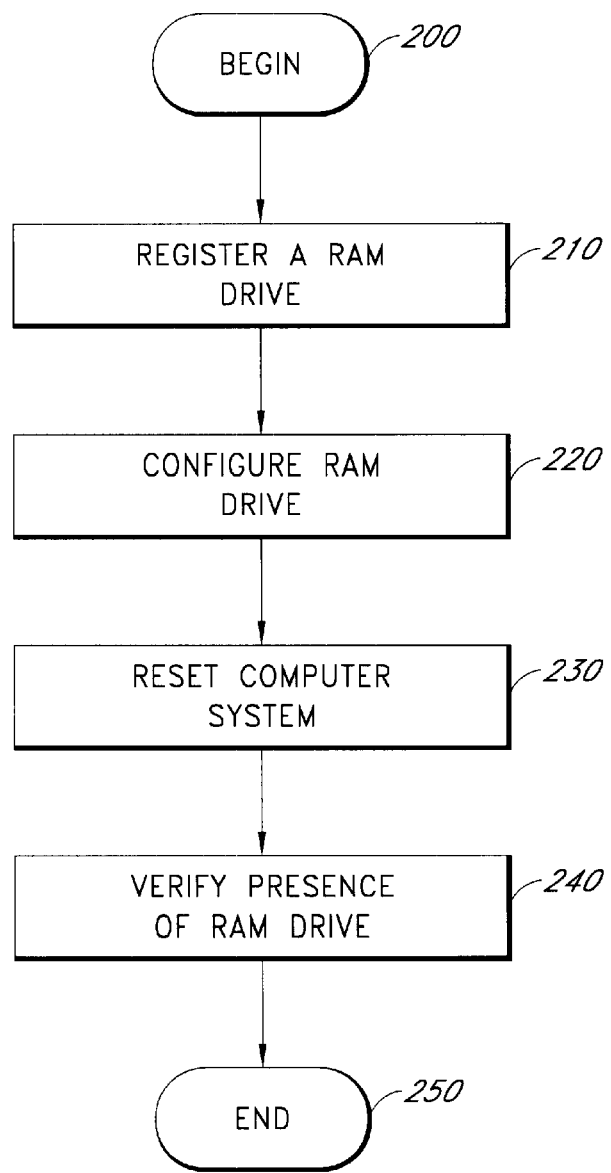
FIG. 2 is a flow chart describing the steps executed to establish a RAM drive in the computer system of FIG. 1.

FIG. 2 is a flow chart describing the steps executed to establish a RAM drive in the computer system 100 (FIG. 1). The process of establishing the RAM drive begins at step 200. In this embodiment, the main memory 160 is selected to create the RAM drive. While other memory locations may be selected for this purpose, the main memory 160 offers a recognizable advantage. Accessing the main memory 160 for read and write operations is generally several tens or hundreds of times faster than accessing the hard drive 154. Hence, when analyzing the data transfer rate between the hard drive 154 and the main memory 160, any delay in the transfer of data between them is mostly attributable to the time spent in accessing the hard drive 154. If desired, however, any other memory location may be selected to create the RAM drive. If accessing the selected memory location is much faster than accessing the device being tested (e.g., the hard drive 154), then the delay due to accessing the memory location may be negligible. If, on the other hand, accessing the selected memory location is not much faster than accessing the device being tested, then it is desirable to independently measure and account for any delay due to accessing the selected memory location.

Referring now to FIG. 2, at step 210, the operator instructs the processor to transfer a RAM drive file to a "drivers" directory of the operating system. In a window-based system, the drivers directory registers all drives available in the system, and is typically located in the winroot\system32\ parent directory. Typically, computer files which designate or register a RAM drive are commercially available and, hence, any such file may be used for this purpose. In this embodiment, the "ramdisk.sys" file, revision 1.13 or later, supplied by Microsoft Corporation, may be used to register a virtual RAM drive. In some cases, a system operator may edit a "ramdisk.ini" file to denote the desired disk size. For example, if a RAM drive having 16 Mbytes is desired, then the DiskSize field may be edited from REG_DWORD 0x00100000 to REG_DWORD 0x01000000.

After the RAM drive is registered in the drivers directory, at step 220, the RAM drive is configured for proper operation. More particularly, a configuration program, such as "regini.exe" may be run with the "ramdisk.ini" file to establish the initial settings of the RAM drive. The ramdisk.ini is typically a text file which includes all the initial settings of the RAM drive, such as the RAM drive's letter name, size, location, available sectors/cluster, etc. At step 230, the system operator may reset (i.e., reboot) the computer system 100 to allow for detection of the newly established RAM drive. At step 240, the system operator typically verifies the presence and detection of the created RAM drive. For example, if "v:" denotes the RAM drive, then the system operator may type v: followed by enter at the DOS prompt to access the RAM drive. It is worth noting that the steps described herein may be programmed to occur automatically pursuant to programmed instructions. The process of establishing the virtual RAM drive concludes at step 250.

FIG. 3 is a flow chart describing the steps executed by the computer system of FIG. 1. As shown in FIG. 3, the benchmark testing process begins at step 300 when the computer system is first turned on or, in some cases, reset. At step 310, the system operator launches the operating system, such as Windows 95, 98, NT, or other similar operating system which is known in the art. In practice, the step of launching the operating system may be programmed to occur automatically upon turning on the computer system using specialized files, such as the "autoexe.bat" file. At step 320, the system operator establishes a virtual RAM drive in the computer system as described in FIG. 2. At step 330, the system operator launches a transfer rate test ("TRT") program to measure the data transfer rate between a source and a target device in the computer system. The TRT program may be constructed using any programming language to initiate the transfer of a particular file, record the start and stop times of the transfer, and compute the transfer data rate of the file. Typically, the TRT program may be implemented as one or more sets of instructions using Visual Basic programming language and environment developed by Microsoft Corporation. Alternatively, the TRT program may be implemented using any suitable programming languages in firmware. Once the TRT program is launched, then at step 340, the system operator is prompted to select whether to perform a data rate test on a read or write operation.

If a data transfer rate test for a read operation is desired, then pursuant to instructions in the TRT program at step 342, the main processor 110 (FIG. 1) initiates the transfer of a pre-designated file from the file location (e.g., external memory drive) to the hard drive 154. As noted above, for a read operation, the hard disk functions as the source device, and the RAM drive functions as the target device. The pre-designated file may comprise any type of data having a particular size. In this embodiment, the size of the pre-designated file is less or equal to about 16 Mbytes. More particularly, a file such as ATLAS.M12 having a size of about 11.3 Mbytes, from MS Encarta CD, may be used.

At step 344, the hard drive 154 copies (i.e., transfers) the pre-designated file to the RAM drive, i.e., main memory 160. Substantially simultaneously with this step, the main processor 110 records the time (the "start time") at which the hard drive 154 begins transferring the pre-designated file to the RAM drive. When the transfer of the pre-designated file is complete, the main processor 110 records the time (the "stop time") at which the RAM drive receives the entire pre-designated file. At step 348, the main processor 110 estimates the transfer time by calculating the difference between start time and stop time. At step 352, the main processor 110 computes the data transfer rate by dividing the size of the pre-designated file by the transfer time. For example, if the size of the pre-designated time is 16 Mbytes, and the transfer time is computed to be 0.5 seconds, then the transfer rate equals 32 Mbytes per second (i.e., 16/0.5). At step 356, the main processor 110 displays to the operator the computed transfer rate via a display monitor. At step 360, the operator selects whether to perform another test for the same or a different device.

If, on the other hand, the operator elects at step 340 to perform a data transfer rate test for a write operation, then pursuant to instructions in the TRT program at step 362, the main processor 110 initiates the transfer of a pre-designated file from the file location (e.g., main memory) to the RAM drive. As noted above, for a write operation, the RAM drive functions as the source device, and the hard disk functions as the target device. At step 364, the RAM drive copies (i.e., transfers) the pre-designated file to the hard drive 154. Substantially simultaneously with this step, the main processor 110 records the time at which the RAM drive begins transferring the pre-designated file to the hard drive 154 (i.e., the start time). When the transfer of the pre-designated file is complete, the main processor 110 records the time at which the hard drive 154 receives the entire pre-designated file (i.e., the stop time). At step 368, the main processor 110 estimates the transfer time by calculating the difference between start time and stop time. At step 372, the main processor 110 computes the data transfer rate by dividing the size of the pre-designated file by the transfer time. At step 376, the main processor 110 displays to the operator the computed transfer rate via a display monitor. At step 380, the operator selects whether to perform another test for the same or a different device. If further tests are desired at steps 360 or 380, then the process returns to steps 344 or 364, respectively. If no further tests are desired, then the process terminates at step 390.

The invention may be implemented with a variety of operating systems having various types of subsystems. The invention provides standardized benchmark results for comparing two or more computer subsystems which conform to different standards. In addition, the invention provides separate read and write operations, thereby circumventing difficulties associated with read and write bursts.

In view of the foregoing, it will be appreciated that the invention overcomes the long-standing need for an accurate and standardized computer benchmark testing system and method. The invention provides a virtual drive in the main memory or random access memory (RAM) of a computer system. With the virtual drive, the invention provides accu rate and consistent read and write data transfer rates into and from a hard drive 154. The invention may be embodied in other specific forms without departing from its spirit or essential characteristics. The described embodiment is to be considered in all respects only illustrative and not restrictive. The scope of the invention is, therefore, indicated by the appended claims rather by the foregoing description. All changes which fall within the meaning and range of equivalency of the claims are to be embraced within their scope.

What is claimed is:

1. A method of assessing performance of a device in a computer, the method comprising:

establishing a virtual drive;

transferring data between the virtual drive and the device; and measuring the transfer rate of data between the virtual drive and the device.

2. The method as defined in claim 1, wherein the act of establishing a virtual drive includes the act of designating a RAM space in the main memory.

3. The method as defined in claim 1, wherein the act of establishing a virtual drive includes the act of registering a RAM drive in a drive register.

4. The method as defined in claim 1, wherein the act of establishing a virtual drive includes the act of resetting the computer to detect the presence of the virtual drive.

5. The method as defined in claim 1, wherein the act of measuring the transfer rate includes the act of recording a start time and a stop time of the data transfer.

6. The method as defined in claim 5, wherein the act of measuring the transfer rate includes the act of dividing the size of data by the difference between the start time and stop time.

7. The method as defined in claim 1, wherein the act of transferring data includes the acts of:

placing a file in a hard drive;

sending the file from the hard drive to the virtual drive; and receiving the file in the virtual drive.

8. The method as defined in claim 1, wherein the act of transferring data includes the acts of:

placing a file in the virtual drive;

sending the file from the virtual drive to the hard drive; and receiving the file in the hard drive.

9. A method of measuring performance of a hard drive in a computer, the method comprising:

establishing a RAM drive in the computer;

transferring a file from the RAM drive to the hard drive;

measuring the duration of time needed to transfer the file from the RAM drive to the hard drive; and determining a data transfer rate of the hard drive.

10. The method as defined in claim 9, further comprising copying the file to the RAM drive.

11. The method as defined in claim 9, wherein the act of establishing the RAM drive includes the act of designating a RAM space in the main memory of the computer.

12. The method as defined in claim 9, wherein the act of determining the data transfer rate includes the act of dividing the size of the file by the duration of time needed to transfer the file.

13. A method of measuring performance of a hard drive in a computer, the method comprising:
   establishing a RAM drive in the computer;
   transferring a file from the hard drive to the RAM drive;
   measuring the duration of time needed to transfer the file from the hard drive to the RAM drive; and
   determining a data transfer rate of the hard drive.

14. The method as defined in claim 13, further comprising copying the file to the hard drive.

15. The method as defined in claim 13, wherein the act of establishing the RAM drive includes the act of designating a RAM space in the main memory of the computer.

16. The method as defined in claim 13, wherein the act of determining the data transfer rate includes the act of dividing the size of the file by the duration of time needed to transfer the file.

* * * * *